Figure 1:
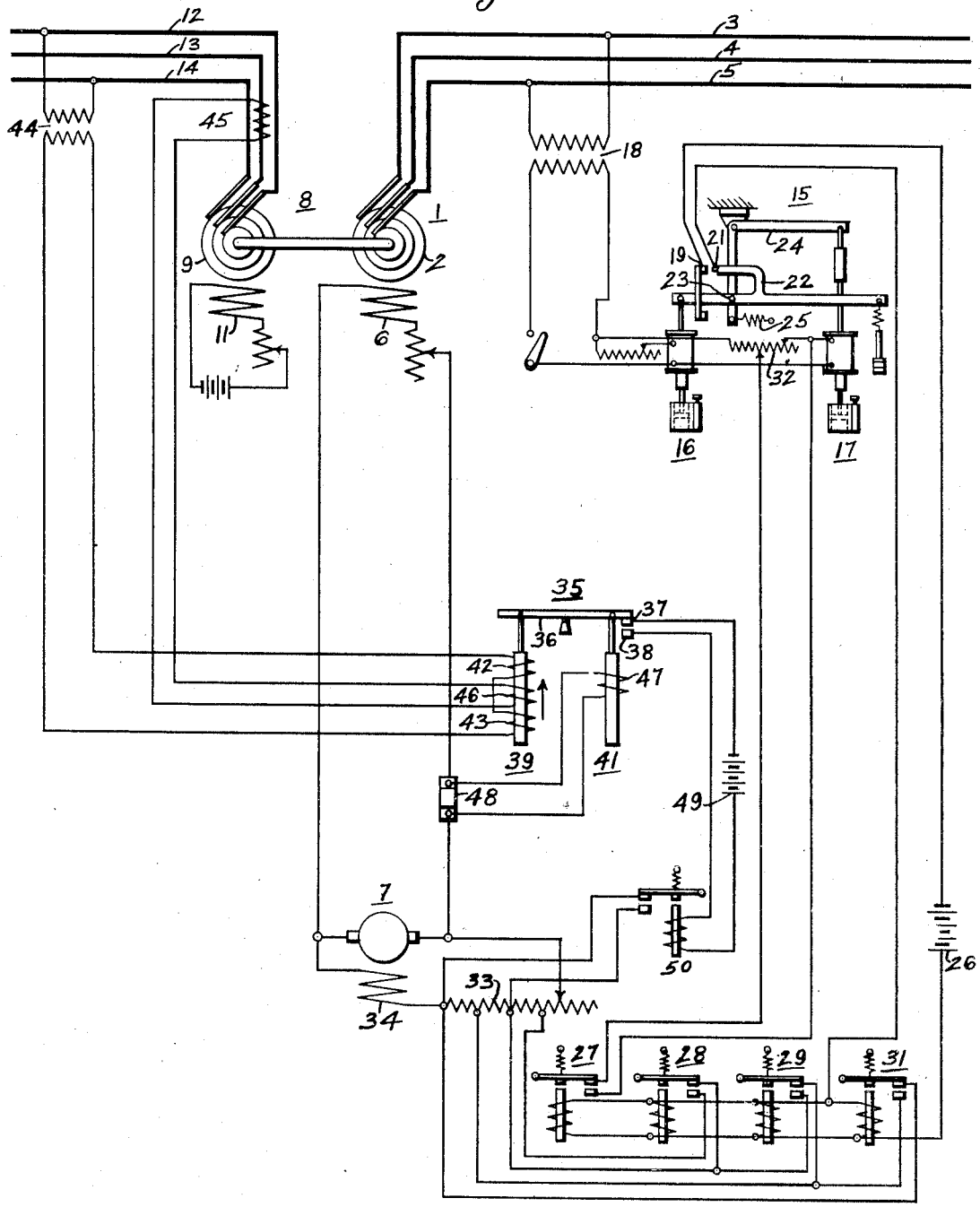

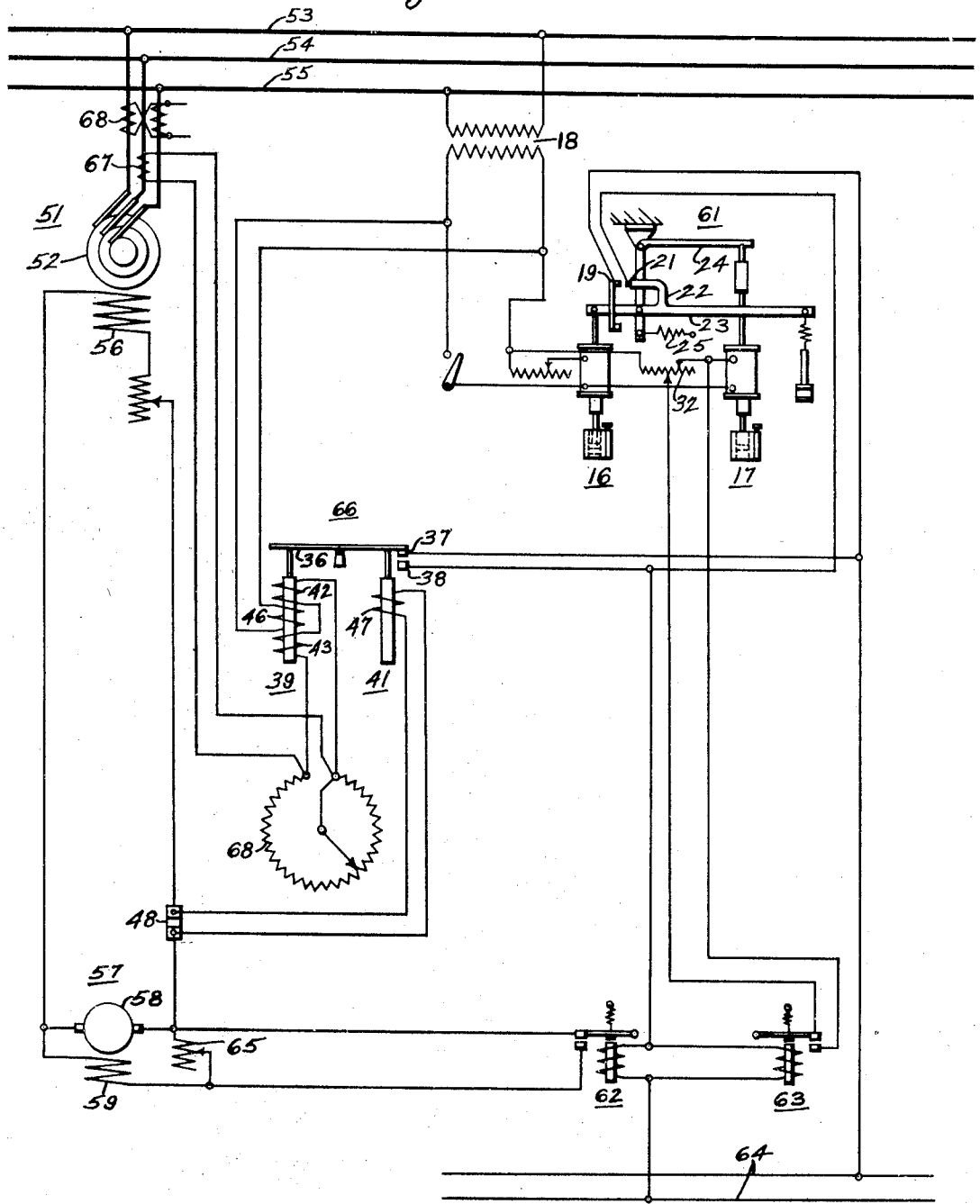

Patented Dec. 10, 1929

1,739,159

UNITED STATES PATENT OFFICE

JOSEPH P. MAXWELL AND ROYAL C. BERGVALL, OF WILKINSBURG, AND JOHN H. ASHBAUGH, OF PITTSBURGH, PENNSYLVANIA, ASSIGNORS TO WESTINGHOUSE ELECTRIC AND MANUFACTURING COMPANY, A CORPORATION OF PENNSYLVANIA

REGULATOR SYSTEM

Application filed April 12, 1928. Serial No. 269,452.

Our invention relates to regulator systems wherein the field winding of a synchronous dynamo-electric machine is regulated in accordance with an electric characteristic of a transmission line to which the machine is connected within a predetermined load limit on the machine.

In the operation of transmission lines, it is customary to correct for power-factor variations by the use of a synchronous condenser connected to the power circuit, and to control the excitation of the synchronous condenser by means of a voltage regulator connected to the transmission line. Since the voltage rise and drop on the transmission line are functions of the power-factor variation of the line, the voltage regulator may be adjusted to so govern the synchronous condenser as to control the value of leading or lagging current taken from the line in accordance with the power-factor correction required.

A synchronous motor may be used for the double purpose of driving a mechanical load and for correcting for power-factor variations of the circuit from which the power is supplied to the motor, the synchronous-condenser action being controlled by varying the field excitation of the motor, as above indicated.

In governing the excitation of a dynamo-electric machine, used as a motor and as a synchronous condenser, it is desirable that the range of variation of the field excitation of the machine be so limited that the machine will always develop sufficient torque to carry the load connected to it.

In case the voltage conditions of the power circuit are such that the regulator operates to weaken the field of the motor below a predetermined value, for a given load on the motor, a condition will be reached where the motor will fail to develop sufficient torque to carry its load, thus causing it to fall out of synchronism. In order to prevent the motor from stopping from this cause, it is necessary to limit the decrease in motor-field current to a predetermined minimum for a given load on the motor. The lighter the load on the motor, at any particular time, the greater the permissible condenser action, or the lesser the minimum field excitation required to maintain synchronous operation of the motor.

A regulator system organized in accordance with our invention may be used to so control the range of excitation of a generator as to limit the real or the reactive load on the generator.

An object of our invention is to provide for regulating the excitation of a dynamo-electric machine in response to an electric characteristic of a power circuit to which it is connected and to provide for limiting the operative range in field excitation of the dynamo-electric machine, in accordance with the load thereon.

Our invention will be better understood by reference to the accompanying drawing, in which Figure 1 is a diagrammatic view of an embodiment of the invention applied to a frequency-changer set, and Fig. 2 is a diagrammatic view of an embodiment of the invention applied to a single dynamo-electric machine.

Referring to Fig. 1 of the drawing, a synchronous motor 1 is illustrated as having an armature winding 2 that is connected to transmission-line conductors 3, 4, 5, and a field winding 6 that is connected to be energized from an exciter generator 7. The motor 1 is mechanically connected to an alternator 8, having an armature winding 9 and a field winding 11, and connected to supply energy to the power-circuit conductors 12, 13, 14.

A regulator 15, of a well-known vibrating type, is illustrated as having two electromagnets 16 and 17 that are connected to the secondary winding of a voltage transformer 18, the primary winding of which is energized in accordance with the voltage of the power circuit supplying energy to the motor 1.

The regulator 15 operates to intermittently cause the engagement and disengagement of contact members 19 and 21, for varying periods of time, to close and open a circuit connected in shunt relation to a resistor in the field-winding circuit of the exciter generator 7, to thereby govern the excitation of the motor field winding. The contact member 21 is movably mounted on the bell-crank lever 22, pivotally supported at the point 23, upon the lower arm of a second bell-crank lever 24. The lever 22 is mechanically connected to be operated by the core of the electromagnet 16, and the lever 24 is mechanically connected to be operated by the core member of electromagnet 17, aided by a biasing member 25.

Upon engagement of the regulator contact members 19 and 21, a circuit is completed which extends from a source of electric energy 26 through the operating windings of the relays 27, 28, 29 and 31. Energization of the operating windings of the several relays causes the armature members thereof to be actuated downwardly against the pull of biasing springs normally holding the relay contact members disengaged, thereby causing engagement of the relay contact members. The relay 27 closes a circuit in shunt relation to a resistor 32 that is in series-circuit relation with the winding of the magnet 17, increasing the energization of this magnet and causing the core member thereof to be actuated upwardly, thus operating the bell-crank lever 24 to move the pivot 23 toward the right and cause disengagement of the regulator contact members 19 and 21. This action of the electromagnet 17 prevents hunting in the regulator system.

The engagement of the contact members of the relays 28, 29 and 31 closes circuits in shunt relation to portions of a resistor 33 that is connected in series-circuit relation with the field winding 34 of the exciter generator 7, thus increasing the voltage of the exciter generator 7 and the excitation of the synchronous motor 1 to restore the desired voltage on the power circuit conductors 3, 4, 5.

A field-current-limiting regulator 35 is shown having a movable arm 36 that is pivotally mounted and provided with a contact member 37 that is disposed to engage a fixed contact member 38. The lever 36 is actuated through the cooperative action of a watt electromagnet 39 and an electromagnet 41 that functions as a minimum-field-current regulator. The magnet 39 is provided with differentially related windings 42 and 43 that are connected in series-circuit relation with each other, and to the secondary winding of a voltage transformer 44, the primary winding of which is energized in accordance with the voltage of the power-circuit conductors 12, 13, 14. The electromagnet 39 is provided also with a winding 46 that is centrally disposed with respect to the windings 42 and 43, and is connected to the current transformer 45, that is energized in accordance with the current flowing in the power-circuit conductors 12, 13, 14. The electromagnet 39 is, therefore, energized in accordance with the watts flowing from the generator 8, and is given an upward bias in accordance with the variations in the power output of the generator 8.

The electromagnet 41 comprises a core member and a winding 47 for biasing the core member in an upward direction, the winding being connected to a shunt 48 in circuit with the field winding 6 of the synchronous motor 1.

Upon a decrease in the current flowing in the circuit of the field winding 6 below a predetermined value, the core member of the electromagnet 41 will drop, causing the contact members 37 and 38 to engage and complete a circuit from the source of electrical energy 49 through the operating winding of the relay 50, causing the relay to close a circuit in shunt relation to a portion of the resistor 33, thus increasing the voltage of the exciter generator 7 and the excitation of the synchronous motor 1.

If the regulator 15 is operating to control the excitation of the synchronous motor 1 in accordance with the voltage of the power-circuit conductors 3, 4, 5 and the voltage of the power circuit rises, for any reason, to such an extent that the vibrating voltage regulator tends to reduce the field excitation of the synchronous motor 1 sufficiently to endanger the synchronous action of the motor, the electromagnet 41 will function as a minimum-field-current regulator for the synchronous motor, closing a circuit through the contact members 37 and 38, and governing the field excitation in the manner described above.

When the synchronous motor is running at light load, the electromagnet 41 alone will control the contact members 37 and 38. If the load upon the generator 8 increases, under which condition it becomes necessary to increase the excitation of the motor 1 in order to prevent it from pulling out of synchronism, the watt element, or electromagnet 39 is biased upwardly to oppose the action of the electromagnet 41, to a certain extent, so that a greater current is required in the winding 47, corresponding to a greater current in the field winding 6, to so operate the lever 36 as to disengage the contact members 37 and 38. The electromagnet 39, therefore, so compensates the action of the electromagnet 41 that the calibration of the regulator 35 is changed in accordance with the change in load on the generator 8 and the motor 1.

Referring particularly to the embodiment of the invention illustrated in Fig. 2 of the drawing, a synchronous dynamo-electric machine 51, which may operate as a generator or as a motor, is shown having an armature winding 52 connected to the power-circuit conductors 53, 54, 55, and having a field winding 56 connected to be energized by the exciter generator 57. The exciter generator 57 is provided with an armature winding 58, and a field winding 59, the energization of which is controlled by the regulator 61 that is similar in construction to the regulator 15 of Fig. 1. The regulator 61 controls the operation of the relays 62 and 63 which are supplied with energy from supply-circuit conductors 64. The relay 63 closes a circuit in shunt relation to the regulator resistor 32, and the relay 62 closes a circuit in shunt relation to the resistor 65 in circuit with the exciter field winding 59. A minimum-field-current regulator 66 is provided that is similar, in construction, to the regulator 35 shown in Fig. 1. The winding 46 of the electromagnet 39 is, in this embodiment of the invention, connected across the secondary winding of the voltage transformer 18, and the differentially related series windings 42 and 43 of the electromagnet are connected to a current transformer 67 that is responsive to the current flowing to the machine 51. A current-adjusting rheostat is shown connected in shunt relation to the windings 42 and 43 to adjust the regulator.

The regulators 61 and 66, in the embodiment of the invention illustrated in Fig. 2, are similar in their functions to the regulators 15 and 35, respectively, illustrated in Fig. 1 of the drawing, with the difference that the electromagnet 39 of the regulator 66 is actuated in accordance with the power flowing to the synchronous machine 51 instead of to the power flowing from the generator 8.

With the connection of the transformer 18 to the line conductors 53 and 55 as shown, the regulator windings 42 and 43 will be connected to the current transformer 67 when it is desired to limit the excitation of the machine 51 in accordance with the reactive power of the machine, as when operating as a motor and a synchronous condenser. When it is desired to limit the excitation of the machine 51 in accordance with the real power of the machine, as may be the case when the machine is operating as a generator, the cross-connected current transformers 68 will be substituted in the circuit for the current transformer 67.

Many modifications may be made in the circuits and apparatus disclosed without departing from the spirit of our invention, and we desire, therefore, to be limited only by the scope of the appended claims.

We claim as our invention:

1. In a regulator system, an alternating-current power circuit, a synchronous dynamo-electric machine connected to said power circuit and comprising a field winding, regulating means actuated in accordance with an electrical characteristic of said power circuit for governing the excitation of said field winding, means for limiting a decrease in the excitation of said field winding to a predetermined minimum, and means for increasing said minimum in accordance with the load on said dynamo-electric machine.

2. In a regulator system, an alternating-current power circuit, a synchronous dynamo-electric machine connected to said power circuit and comprising a field winding, regulating means actuated in accordance with an electrical characteristic of said power circuit for governing the excitation of said field winding, a device for limiting the range of action of said regulating means to maintain the excitation of said field winding above a predetermined value, and means for biasing said device to increase the minimum excitation of said field winding in accordance with the load on said dynamo-electric machine.

3. In a regulator system, an alternating-current power circuit, a synchronous dynamo-electric machine connected to said power circuit and comprising a field winding, regulating means actuated in accordance with an electrical characteristic of said power circuit for governing the excitation of said field winding, and means for limiting the effective range of operation of said regulating means to prevent the reduction of the field excitation of said dynamo-electric machine below a predetermined value for a given load on said machine.

4. In a regulator system, an alternating-current power circuit, a synchronous dynamo-electric machine connected to said power circuit and comprising a field winding, regulating means actuated in accordance with an electrical characteristic of said power circuit for governing the excitation of said field winding, and mechanism for limiting the effective range of operation of said regulator, said mechanism being actuated in accordance with the load on said dynamo-electric machine and in accordance with the field current of said machine.

5. In a regulator system, an alternating-current power circuit, a synchronous dynamo-electric machine connected to said power circuit and comprising a field winding, regulating means actuated in accordance with an electrical characteristic of said power circuit for governing the excitation of said field winding, a contact-actuating device for limiting the range of action of said regulating means, means for biasing said contact-actuating device in accordance with the load on said dynamo-electric machine, and means for biasing said contact-actuating device in accordance with the excitation of said dynamo-electric machine.

6. In a regulator system, an alternating-current power circuit, a synchronous dynamo-electric machine connected to said power circuit and comprising a field winding, regulating means actuated in accordance with an electrical characteristic of said power circuit for governing the excitation of said field winding, a contact-actuating device for limiting the range of operation of said regulating means comprising two differentially related electromagnets, means for energizing one of said electromagnets, in accordance with the load on said dynamo-electric machine, and means for energizing the other of said electromagnets in accordance with the field current of said machine.

7. In a regulator system, a power circuit, a synchronous motor connected to said power circuit and having a field winding, a regulator for governing the excitation of said field winding in accordance with an electrical characteristic of said power circuit, and means differentially responsive to the power flowing to said motor and to the current flowing in the field winding thereof for limiting the range of excitation of said field winding.

8. In a regulator system, a power circuit, a synchronous motor connected to said power circuit and having a field winding, a regulator for governing the excitation of said field winding in accordance with an electrical characteristic of said power circuit, and means for so limiting the range of excitation of said field winding as to prevent the ratio between the power flowing to said motor and the excitation of said field winding from exceeding a predetermined value.

9. In a regulator system, an alternating-current power circuit, a synchronous motor connected to said power circuit and comprising a field winding, a generator driven by said motor, regulating means actuated in accordance with an electrical characteristic of said power circuit for governing the excitation of said field winding, and means actuated in accordance with the power output of said generator for limiting the range of excitation of said field winding.

10. In a regulator system, an alternating-current power circuit, a synchronous motor connected to said power circuit and comprising a field winding, a generator driven by said motor, regulating means actuated in accordance with an electrical characteristic of said power circuit for governing the excitation of said field winding, and means for preventing a decrease in the excitation of said synchronous motor below a value corresponding to the motor torque required to drive the generator.

11. In a regulator system, an alternating-current power circuit, a synchronous motor connected to be driven from said power circuit and comprising a field winding, regulating means actuated in accordance with an electric characteristic of said power circuit for governing the excitation of said field winding, and means responsive to the load on the motor for preventing a decrease in the excitation thereof below the value necessary for synchronous operation of the motor.

In testimony whereof, we have hereunto subscribed our names this 11th day of April, 1928.

JOSEPH P. MAXWELL.
ROYAL C. BERGVALL.
JOHN H. ASHBAUGH.